(12) United States Patent
Wu et al.

(10) Patent No.: US 9,664,911 B2
(45) Date of Patent: May 30, 2017

(54) PARALLAX BARRIER, MANUFACTURING METHOD THEREOF AND DISPLAY SYSTEM

(71) Applicant: BOE TECHNOLOGY GROUP CO., LTD., Beijing (CN)

(72) Inventors: Kun Wu, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 200 days.

(21) Appl. No.: 14/064,541

(22) Filed: Oct. 28, 2013

(65) Prior Publication Data

US 2014/0118822 A1 May 1, 2014

(30) Foreign Application Priority Data

Oct. 29, 2012 (CN) .......................... 2012 1 0422463

(51) Int. Cl.
*G02B 27/22* (2006.01)
(52) U.S. Cl.
CPC ..... *G02B 27/2214* (2013.01); *Y10T 29/49105* (2015.01)
(58) Field of Classification Search
CPC G02B 27/2214; G02B 27/22; G02B 27/2228; G02B 27/2264; G02B 3/0012;
(Continued)

(56) References Cited

U.S. PATENT DOCUMENTS 6,220,914 B1* 4/2001 Lee et al. .......................... 445/24
2008/0297880 A1* 12/2008 Steckl .................. G02B 26/004
359/291

(Continued)

FOREIGN PATENT DOCUMENTS

| CN | 101504486 A | 8/2009 |
| CN | 102566060 A | 7/2012 |
| CN | 202837759 U | 3/2013 |

OTHER PUBLICATIONS

First Office Action issued by the Chinese Patent Office for Chinese Patent Application No. Jun. 30, 2014, 6pgs.

(Continued)

*Primary Examiner* — Scott J Sugarman
*Assistant Examiner* — Balram Parbadia
(74) *Attorney, Agent, or Firm* — Ladas & Parry LLP

(57) ABSTRACT

A parallax barrier, a manufacturing method thereof and a display system are provided, the parallax barrier including: a first substrate and a second substrate cell-assembled; a peripheral cavity wall, used to form a closed cavity; a transparent hydrophilic fluid and an opaque hydrophobic fluid, filled in the closed cavity; a first electrode and a second electrode; a hydrophobic-hydrophilic switching layer, on the second electrode; and barrier walls, disposed on the hydrophobic-hydrophilic switching layer parallel to each other and spaced apart from each other, wherein at least a part of each barrier wall is transparent, and when not being powered on, a thickness of the hydrophobic fluid is not larger than a height of the barrier wall, and when being powered on, a highest place of each accumulation region of the hydrophobic fluid is not higher than a highest place of the corresponding barrier wall.

19 Claims, 5 Drawing Sheets

(58) Field of Classification Search
CPC ........... H04N 13/0404; H04N 13/0409; H04N 2213/001; H04N 13/0413; H04N 13/0415; H04N 13/0438; G02F 1/133512; G02F 1/133524; G02F 1/1362; G02F 1/134309
See application file for complete search history.

(56) References Cited

U.S. PATENT DOCUMENTS

| | | | | |
|---|---|---|---|---|
| 2009/0027751 | A1* | 1/2009 | Chen | G09G 3/3433 359/228 |
| 2010/0053717 | A1* | 3/2010 | Takahashi | G02B 3/0056 359/228 |
| 2010/0232000 | A1* | 9/2010 | Futterer | G02B 26/005 359/9 |
| 2011/0084944 | A1* | 4/2011 | Bae | 345/205 |
| 2011/0122128 | A1* | 5/2011 | Akita | 345/419 |
| 2011/0316764 | A1* | 12/2011 | Parry-Jones | G02B 26/005 345/60 |
| 2012/0170115 | A1 | 7/2012 | Zhang et al. | |
| 2013/0038922 | A1* | 2/2013 | Kirita | G02B 26/005 359/316 |
| 2013/0162610 | A1* | 6/2013 | Cho et al. | 345/205 |

OTHER PUBLICATIONS

English translation of First Office Action issued by the Chinese Patent Office for Chinese Patent Application No. Jun. 30, 2014, 6pgs.

Second Office Action issued by the Chinese Patent Office for Chinese Patent Application No. 2012104224638 dated Sep. 5, 2014, 5pgs.

English translation of Second Office Action issued by the Chinese Patent Office for Chinese Patent Application No. 2012104224638 dated Sep. 5, 2014, 7pgs.

* cited by examiner

PARALLAX BARRIER, MANUFACTURING METHOD THEREOF AND DISPLAY SYSTEM

CROSS REFERENCE TO RELATED APPLICATIONS

This application claims priority from Chinese National Application No. 201210422463.8filed on Oct. 29, 2012, the contents of which are incorporated herein by reference.

TECHNICAL FIELD

Embodiments of the present invention relate to a parallax barrier, a manufacturing method thereof and a display system.

BACKGROUND

The stereoscopic display has become a major trend in the display field. The phenomenon of the stereoscopic display is generated from a parallax. More specifically, a left-eye image and a right-eye image are send into a viewer's left eye and right eye respectively, wherein the left-eye image and the right-eye image are a pair of stereoscopic images with parallax.

A naked eye stereoscopic display device is one of stereoscopic display devices and becomes more and more popular in the stereoscopic display field.

At present, there are mainly three ways to achieve the naked eye stereoscopic display such as lenticular lens stereoscopic display, a parallax barrier stereoscopic display and a holographic stereoscopic display.

Here, the parallax barrier stereoscopic display technology is further classified into a physical parallax barrier stereoscopic display technology and a liquid crystal parallax barrier stereoscopic display technology. A physical parallax barrier is a solid state unit, and after assembled to a liquid crystal display panel, only three-dimensional images can be displayed. Therefore there is a disadvantage that two-dimensional planar images can not be displayed. A liquid crystal parallax barrier can perform switching between a two-dimensional planar image and a three-dimensional image. FIG. 1 shows a cross-sectional view of a current liquid crystal parallax barrier stereoscopic display device, which includes a liquid crystal display device (LCD) 10, a backlight unit 11, a liquid crystal parallax barrier 12. The liquid crystal display device 10 includes a display panel 101, a second polarizer 102 and a third polarizer 103. The liquid crystal parallax barrier 12 includes a first substrate 121 and a second substrate 122 disposed opposite to each other, and a liquid crystal layer 120 disposed between the two substrates; a second electrode 127 and a second alignment film 131 are disposed on the second substrate 122, and a first electrode 126 and a first alignment film 130 are disposed on the first substrate 121. In addition, a first polarizer 132 is further disposed at a light-emitting side of the liquid crystal parallax barrier 12. However, the liquid crystal parallax barrier shown in FIG. 1 is only applicable to a display device with a polarized emitting light. Therefore, the liquid crystal parallax barrier shown in FIG. 1 can not be applied to an organic light emitting display (OLED), a plasma display panel (PDP) and a field emission display (FED). Furthermore, the polarizer disposed at the light-emitting side of the liquid crystal parallax barrier shown in FIG. 1 may cause the light loss.

SUMMARY

Embodiments of the present invention provide a parallax barrier, a manufacturing method thereof and a display system. The display system constituted by the parallax barrier and a display device capable of generating polarized emitting light or non-polarized emitting light can not only display a three-dimensional image but also realize switching between a three-dimensional image and a 2D planar image.

In one aspect, an embodiment of the present invention provides a parallax barrier, including: a first substrate; a second substrate, cell-assembled with the first substrate; a peripheral cavity wall, disposed on a periphery of the first substrate and the second substrate to form a closed cavity; a hydrophilic fluid and a hydrophobic fluid, filled in the closed cavity, wherein the hydrophilic fluid is a transparent material and the hydrophobic fluid is an opaque material; a first electrode, disposed at a side of the first substrate facing the second substrate; a second electrode, disposed at a side of the second substrate facing the first substrate; a hydrophobic-hydrophilic switching layer, disposed at a side of the second electrode facing the first substrate; and a plurality of barrier walls, disposed at a side of the hydrophobic-hydrophilic switching layer facing the first substrate parallel to each other and spaced apart from each other along a direction parallel to a plane in which the second substrate is located, wherein at least a part of each of the barrier walls is transparent, and when not being powered on, a thickness of the hydrophobic fluid is not larger than a height of each of the barrier walls, and when being powered on, a highest place of each of accumulation regions of the hydrophobic fluid is not higher than a highest place of the corresponding barrier wall.

On the other hand, an embodiment of the present invention provides a display system, including: a display device; a parallax barrier described above, disposed at a light-emitting side or a light incident side of the display device.

In yet another aspect, an embodiment of the present invention further provides a method for manufacturing a parallax barrier, including: forming a first electrode on a first substrate; forming a second electrode on a second substrate; forming a hydrophobic-hydrophilic switching layer on the second electrode; forming a plurality of barrier walls parallel to each other on the hydrophobic-hydrophilic switching layer; forming a periphery cavity wall at a periphery of the second substrate or the first substrate; cell-assembling the first substrate and the second substrate to make the periphery cavity wall to contact the first substrate or the second substrate so as to form a closed cavity, wherein a hydrophobic fluid and a hydrophilic fluid have been filled, the hydrophilic fluid is a transparent material, the hydrophobic fluid is an opaque material; and while not being powered on, a thickness of the hydrophobic fluid is not larger than a height of each of the barrier walls, while being powered on, a highest place of an accumulation region of the hydrophobic fluid is not larger than a highest place of the corresponding barrier wall.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
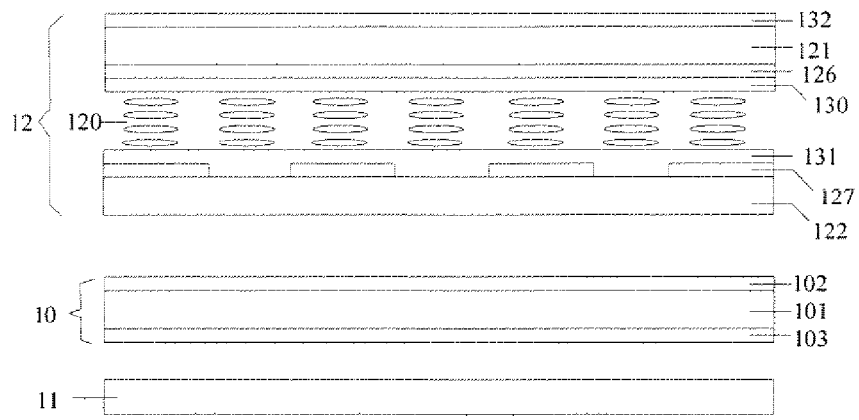
FIG. 1 is a structural cross-sectional view of a current liquid crystal parallax barrier stereoscopic display device.
Figure 2:
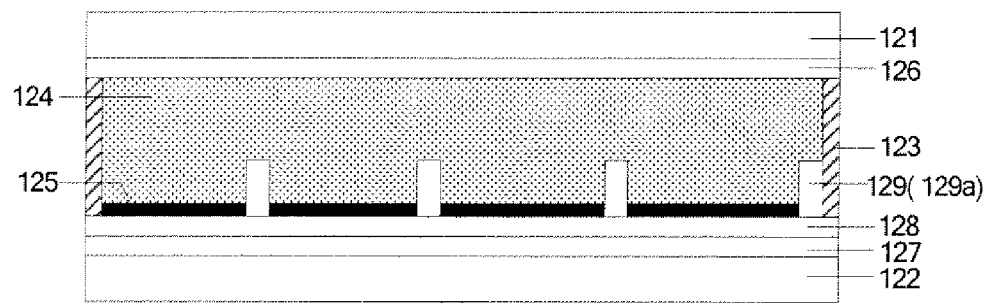
FIG. 2 is a structural cross-sectional view of a parallax barrier according to an embodiment of the present invention.

An embodiment of the present invention provides a parallax barrier, as shown in FIGS. 2-1, including: a first substrate 121; a second substrate 122 cell-assembled with the first substrate 121; a periphery cavity wall 123, disposed on a periphery of the first substrate and the second substrate to form a closed cavity; and a hydrophilic fluid 124 and a hydrophobic fluid 125, filled in the closed cavity, wherein the hydrophilic fluid 124 is a transparent material and the hydrophobic fluid 125 is an opaque material.

Further, the parallax barrier includes: a first electrode 126, disposed at a side of the first substrate 121 facing the second substrate 122; a second electrode 127, disposed at a side of the second substrate 122 facing the first substrate 121; a hydrophobic-hydrophilic switching layer 128, disposed at a side of the second electrode 122 facing the first substrate 121; and a plurality of barrier walls 129, disposed at a side of the hydrophobic-hydrophilic switching layer 128 facing the first substrate 121 parallel to each other and spaced apart from each other along a direction parallel to a plane in which the second substrate 122 is located, wherein at least a part of each of the plurality of barrier walls 129 is transparent, and when not being powered on, a thickness of the hydrophobic fluid is not larger than a height of each of the barrier walls 129, and when being powered on, a highest place of each of accumulation regions of the hydrophobic fluid is not higher than a highest place of the corresponding barrier wall 129.

Each of the barrier walls 129 shown in FIG. 2 includes a transparent barrier strip 129a. Then, while not being powered on, the thickness of the hydrophobic fluid 125 is not larger than the height of the transparent barrier strip 129a, and while being powered on, a highest place of the accumulation region of the hydrophobic fluid 125 is not higher than a highest place of the transparent barrier strip 129a.

Here, being powered on/not being powered on is stated for the first electrode 126 and the second electrode 127. In an embodiment of the present invention, being powered on is a condition that a voltage larger than or equal to a threshold voltage is applied such that the hydrophobic fluid flows towards the barrier wall 129 and accumulates at a side of the barrier wall 129; the highest place of the accumulation region of the hydrophobic fluid 125 refers to a highest place of the accumulation region of the hydrophobic fluid formed by the hydrophobic fluid accumulating to one place when the voltage difference between the first electrode 126 and the second electrode 127 is up to a certain voltage.

Exemplarily, in an embodiment of the present invention, the hydrophobic fluid 125 may be oil or other oleophilic fluid, and the hydrophilic fluid 124 may be water or other hydrophilic fluid. The transparent barrier strip 129a may be formed of a transparent material with a refractive index which is the same or similar to that of the first substrate 121 (and the second substrate 122). For example, the first substrate 121 (and the second substrate 122) may be formed of a transparent glass with a refractive index of 1.5-1.9, and accordingly, the transparent barrier strip 129a may also be formed of a transparent glass with a refractive index of 1.5-1.9.

Exemplarily, the hydrophobic-hydrophilic switching layer 128 may be formed of a hydrophobic-hydrophilic switching material, such as, Polytetrafluoroethylene (PTEF) (for example, Teflon AF1600), CYTOP and bismuth ferrite doped with praseodymium and manganese (for example, $(Bi_{0.86}Pr_{0.14})(Fe_{0.95}Mn_{0.05})O_3$).

In an embodiment of the present invention, as shown in FIGS. 2-8, in case of not being powered on, the hydrophobic fluid 125 would spread along the hydrophobic-hydrophilic switching layer 128 under its action. Because a plurality of parallel barrier walls 129 are disposed, the transparent barrier strips 129a block the hydrophobic fluid 125 from flowing over the transparent barrier strips 129a, that is, the hydrophobic fluid 125 is partitioned by the barrier walls 129 into discontinued strips. When the hydrophobic fluid 125 is opaque material, a plurality of alternately bright and dark stripes may be formed on the substrate. When there is light, the light can be transmitted through only a transparent part of the barrier wall 129, thus a grating can be obtained.

It is noted that when the barrier wall only contains the transparent barrier strip, the barrier wall itself is a transparent barrier strip (as shown in FIG. 2), and the barrier wall is transparent.

Figure 9:
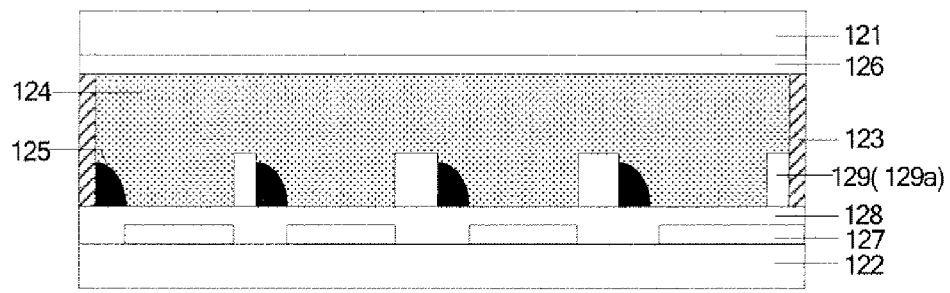
FIG. 9 is a structural cross-sectional view of yet another parallax barrier according to an embodiment of the present invention.
Figure 10:
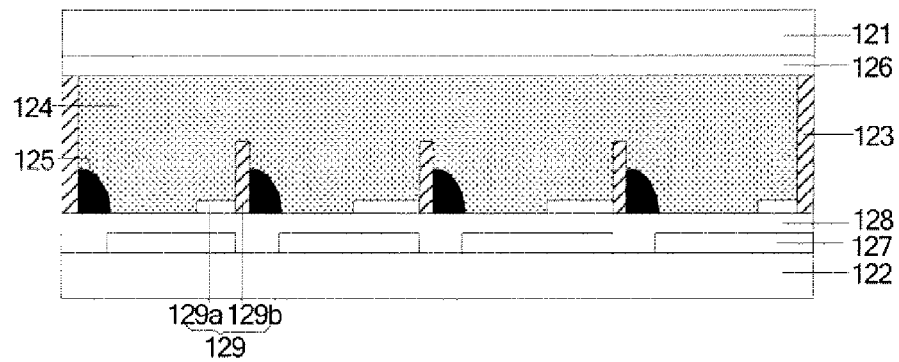
FIG. 10 is a structural cross-sectional view of yet another parallax barrier according to an embodiment of the present invention.
Figure 11:
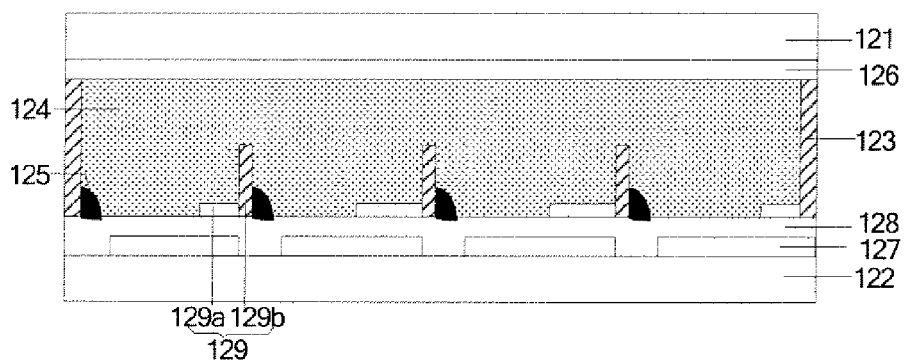
FIG. 11 is a structural cross-sectional view of yet another parallax barrier according to an embodiment of the present invention.

As shown in FIGS. 9-11, when being powered on, that is, the voltage difference applied between the first electrode 126 and the second electrode 127 is up to a certain voltage, the hydrophobic-hydrophilic switching layer 128 undergoes a switching from hydrophobic to hydrophilic, the hydrophilic fluid 124 forces the hydrophobic fluid 125 to accumulate to one side of the barrier wall 129 but not flow over the highest place of the barrier wall 129, thus, enlarging a contact area between the hydrophilic fluid 124 and the hydrophobic-hydrophilic switching layer 128, and narrowing down a width of the opaque hydrophobic fluid 125, and broadening a transparent part of the entire substrate, therefore, when light is incident to the substrate, most of the light can be transmitted through. Herein, the accumulation regions of hydrophobic fluid are in opaque state, and may block certain regions not being desired to be light-transmitting.

Here, the transparent part of the entire substrate is formed of the hydrophilic fluid 124 contacting the hydrophobic-hydrophilic switching layer 128 and the transparent parts of the barrier walls 129.

It is noted that in FIGS. 9-11 show structural schematic views of the parallax barrier under a condition of being powered on when a plurality of second electrode strips constituted the second electrode are disposed to space apart from each other. In a case that the second electrode is formed as a plate-shaped electrode, structural schematic views of the parallax barrier under a condition of being powered on are similar, so they are omitted.

Exemplarily, the first electrode 126 on the first substrate 121 is formed as a plate-shaped electrode.

Furthermore, in an embodiment of the present invention, depending on the arrangement of the barrier walls 129, the hydrophilic fluid 124 may be continuous or discontinuous in the closed cavity enclosed by the periphery cavity wall 123. Here, the barrier walls 129 partition the closed cavity into a plurality of cavity units, when the hydrophilic fluid 124 is discontinuous, the barrier walls 129 contact the first electrode 126 on the first substrate 121, and the cavity units are also closed cavities at this time; when the hydrophilic fluid 124 is continuous, a height of the barrier wall 129 needs to be higher than a thickness of the hydrophobic fluid 125 while being powered on, and the cavity units are non-closed cavities at this time.

Figure 3:
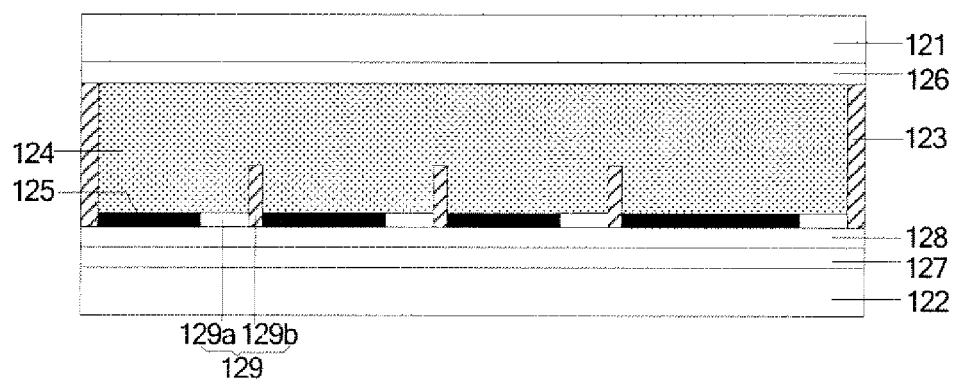
FIG. 3 is a structural cross-sectional view of another parallax barrier according to an embodiment of the present invention.

Exemplarily, as shown in FIG. 3, each of the barrier walls 129 further includes a inner cavity wall 129b directly contacting the transparent barrier strip 129a.

When each of the barrier wall 129 further includes the inner cavity wall 129b, accordingly, while not being powered on, the thickness of the hydrophobic fluid 125 is not larger than the height of the transparent barrier strip 129a, and while being powered on, the highest place of the accumulation region of the hydrophobic fluid 125 is not higher than the highest place of the barrier wall 129. Exemplarily, while not being powered on, the thickness of the hydrophobic fluid 125 is not larger than the height of the transparent barrier strip 129a, and while being powered on, the highest place of the accumulation region of the hydrophobic fluid 125 is not larger than the highest place of the inner cavity wall 129b. That is, the height of the inner cavity wall 129b may be larger than the height of the highest place of the accumulation region of the hydrophobic fluid 125 while being powered on. Of course, the inner cavity wall 129b may contact the first electrode 126 on the first substrate 121, and at this time, the barrier walls partition the closed cavity into a plurality of closed cavity units.

Thus, the inner cavity walls 129b can block the hydrophobic fluid 125 from flowing over the inner cavity walls 129b while being powered on, and thus, it is not necessary for the transparent barrier strips 129a to be too thick (their thickness only needs to be sufficient to block the hydrophobic fluid 125 from flowing over the transparent barrier strips 129a while being not powered on), thereby a issue that the transparent barrier strips 129a with a larger thickness influence the transmittance can be avoided.

Figure 4:
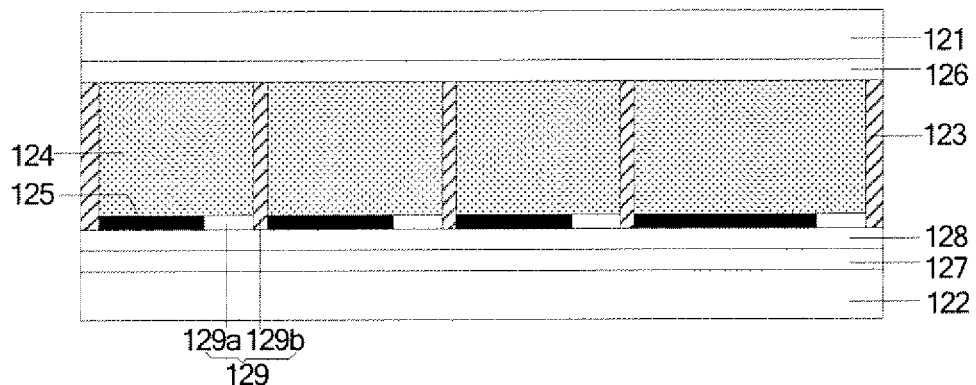
FIG. 4 is a structural cross-sectional view of yet another parallax barrier according to an embodiment of the present invention.

Exemplarily, as shown in FIG. 4, the inner cavity walls 129b may contact the first electrode 126 on the first substrate 121, and thus, the cavity unit is formed as a closed cavity.

Exemplarily, each of the inner cavity walls 129b is located at the same side of the corresponding transparent barrier strip 129a. That is, when viewing the entire substrate, the inner cavity walls 129b all are located at either the right side or the left side of the corresponding transparent barrier strip 129a. Thus, while being powered on, it benefits the hydrophobic fluid 125 partitioned by the barrier walls 129 to accumulate towards one direction.

Herein, it is noted that, in the drawings, description is given with an example that the inner cavity walls 129b are located at the right side of the transparent barrier strips 129a, however an embodiment of the present invention is not limited thereto, the inner cavity walls 129b can partially be at the left side and partially at the right side, all at the right side or all at the left side of the corresponding transparent barrier strips 129a.

Exemplarily, the inner cavity walls 129b may be formed of a hydrophobic material. Thus, while being powered on, it is advantageous for the hydrophobic fluid 125 to accumulate towards the inner cavity walls 129b of the barrier walls 129 in the cavity units. Thus, when the parallax barrier is used for the display device, and the accumulation region corresponds to a non-display region of the display device, the influence of the accumulation region on light emitted from the display device can be reduced.

It is here noted that the parallax barrier provided in an embodiment of the present invention is not limited to being used for the display device, and also may be used individually or may be used for other devices.

Figure 5:
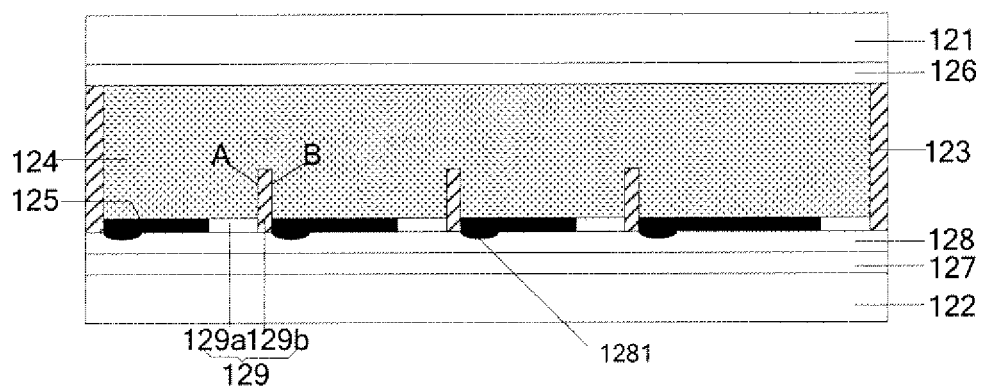
FIG. 5 is a structural cross-sectional view of yet another parallax barrier according to an embodiment of the present invention.

Optionally, as shown in FIG. 5, the hydrophobic-hydrophilic switching layer 128 has grooves 1281 formed therein at a side of each of the inner cavity walls 129b that is opposite to the transparent barrier strip 129a contacting it.

Exemplarily, the grooves 1281 each abut against one side of the inner cavity wall 129b that is opposite to the transparent barrier strip 129a contacting it.

Referring to FIG. 5, the inner cavity wall 129b has two sides, and the side that contacts the transparent barrier strip 129a is defined as side A, another side that is opposite to side A is defined as side B. It can be seen in the figure that side B is the side of the inner cavity wall 129b that is opposite to the transparent barrier strip 129a it contacts. The hydrophobic-hydrophilic switching layer 128 has grooves 1281 formed therein at a side of each of the inner cavity walls 129b that is opposite to the transparent barrier strip 129a. Accordingly, the hydrophobic-hydrophilic switching layer 128 has grooves 1281 formed therein at the side B of each of the inner cavity walls 129b.

Thus, while being powered on, it is advantageous for the hydrophobic fluid 125 to accumulate into the grooves 1281, which allows the hydrophobic fluid 125 to accumulate to a desired side of each of the barrier walls 129.

Optionally, an interval between any two adjacent cavity walls among the peripheral cavity wall 123 and the inner cavity walls 129b that are parallel to each other is equal to each other. Thus, when widths of the transparent barrier strips 129a that contact the inner cavity walls 129b are equal to each other, a parallax barrier with bright stripes having equal widths and dark stripes having equal widths may be generated while not being powered on. When applying the parallax barrier to a display device, each of the cavity units formed by partitioning the closed cavity by barrier walls 129 may correspond to the same number of pixels, generally 2-9 pixels. Here, the pixels are mentioned only for a purpose of describing the parallax barrier with bright stripes having equal widths and dark stripes having equal widths more clearly, it will be not described further as for how each of the cavity units corresponds to the pixels and how many pixels one of the cavity units corresponds to.

Exemplarily, the interval between any two adjacent cavity walls among the peripheral cavity wall 123 and the inner cavity walls 129b that are parallel to each other may be not equal to each other. And accordingly, the widths of the transparent barrier strips 129a that contact the inner cavity walls 129b may also be not equal, an embodiment of the present invention imposes no limitation to this, as long as the formed parallax barrier can split light to realize stereoscopic display effect while being applied to a display device.

Exemplarily, as shown in FIGS. 6-11, the widths of the transparent barrier strips 129a which contact the inner cavity walls 129b become narrower and narrower in a direction from a middle position to either edge of the second substrate 122.

Since when the parallax barrier is applied to a display device for the stereoscopic display, in an ideal case, a left eye of a view only sees a left eye parallax image and a right eye only sees a right eye parallax image, thereby seeing an ideal stereoscopic image. However, for some viewing points, a crosstalk may occur between the left and right eye parallax images. In an embodiment of the present invention, the widths of the transparent barrier strips 129a are made to become narrower and narrower from the middle position to either edge of the second substrate 122, which can improve the crosstalk at some viewing points.

Optionally, as shown in FIGS. 6-11, the barrier walls 129 partition the closed cavity into a plurality of cavity units; the second electrode 127 includes a plurality of second electrode strips spaced apart from each other at an interval and being in a one-to-one correspondence relationship with the cavity units, and a interval between adjacent the second electrode strips 127 corresponds to the corresponding accumulation region of the hydrophobic fluid 125 while being powered on.

Each of the intervals between the above-mentioned second electrode strips 127 corresponds to the corresponding accumulation regions of the hydrophobic fluid with a purpose for the hydrophobic fluid 125 to accumulate to a side of the cavity units where it is desired for accumulation.

It should be noted that "the second electrode strips 127 being in one-to-one correspondence relationship with the cavity units" here means "each of the second electrode strips partially overlaps with the corresponding cavity unit in a top view or a bottom view". Furthermore, "the intervals between the second electrode strips 127 corresponding to accumulation regions of the hydrophobic fluid while being powered on" means here that "each of the intervals of the second electrode strips 127 partially overlaps with the corresponding accumulation region of the hydrophobic fluid while being powered on in a top view or a bottom view".

Figure 6:
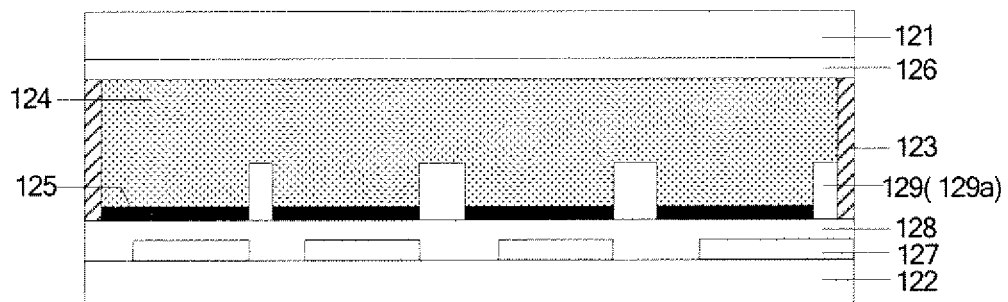
FIG. 6 is a structural cross-sectional view of yet another parallax barrier according to embodiments of the present invention.

Exemplarily, as shown in FIG. 6, when each of the barrier walls 129 only contains a transparent barrier strip 129a, in order to facilitate accumulation of the hydrophobic fluid 125 towards one side of each of the cavity units while being powered on, the interval between adjacent the second electrode strips may corresponds to the corresponding accumulation region of the hydrophobic fluid 125 and the corresponding transparent barrier strip 129a which the hydrophobic fluid 125 contacts. However, an embodiment of the present invention is not limited to this, a width of the interval between the second electrode strips may be set according to actual requirements.

Figure 7:
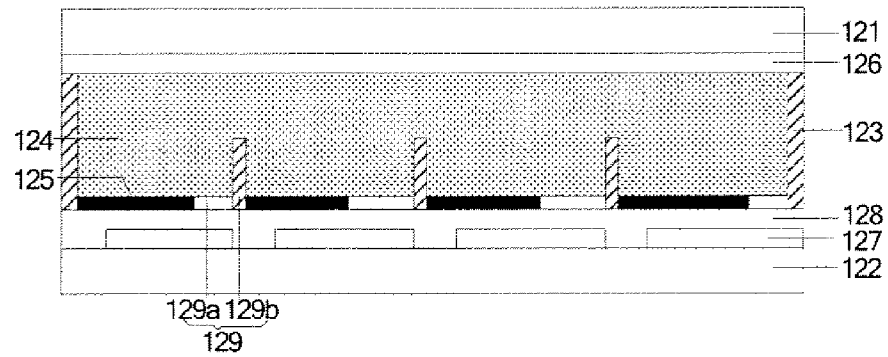
FIG. 7 is a structural cross-sectional view of yet another parallax barrier according to an embodiment of the present invention.

Exemplarily, as shown in FIG. 7, when each of the barrier walls 129 includes the transparent barrier strip 129a and a inner cavity wall 129b, in order to facilitate accumulation of the hydrophobic fluid 125 towards one side of each of the cavity units while being powered on, the interval between adjacent the second electrode strips may corresponds to the corresponding accumulation region of the hydrophobic fluid 125 and the corresponding inner cavity wall 129b which the hydrophobic fluid 125 contacts. However, an embodiment of the present invention is not limited to this, the width of the interval between the second electrode strips may be set according to actual requirements.

Figure 8:
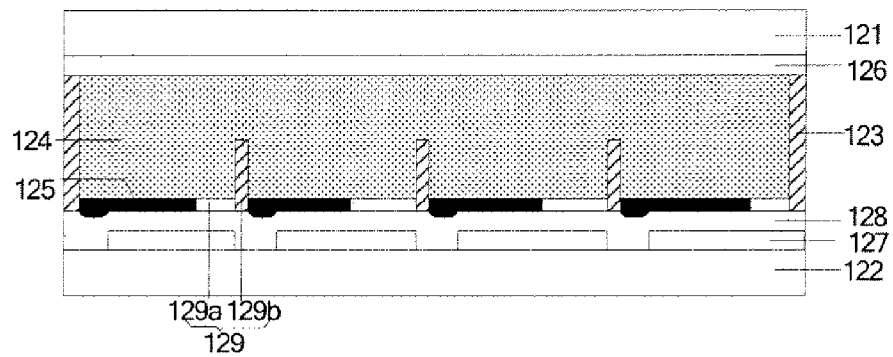
FIG. 8 is a structural cross-sectional view of yet another parallax barrier according to an embodiment of the present invention.

Exemplarily, as shown in FIG. 8, when grooves 1281 are formed in the hydrophobic-hydrophilic switching layer 128, the interval between adjacent the second electrode strips 127 may corresponds to the corresponding groove and the inner cavity wall 129b being adjacent to the corresponding groove.

Furthermore, the second electrode strips 127 corresponding to the cavity units may be provided with different voltages and a size of a light-transmitting region in each cavity unit may be changed by changing magnitude of the voltage. When applying the parallax barrier including a plurality of discontinuous second electrode strips 127 to a display device, different voltages may be supplies to the second electrode strips 127 depending on a view's eye position, thereby reducing crosstalk.

An embodiment of the present invention provides a parallax barrier in which a first electrode is disposed on a first substrate, a second electrode and a second hydrophobic-hydrophilic switching layer are disposed on a second substrate, and in a closed cavity formed between the two substrates, a opaque hydrophobic fluid and a transparent hydrophilic fluid are filled. Due to the blocking of a plurality of parallel barrier walls each including a transparent part and the action of the hydrophobic-hydrophilic switching layer, while the first electrode and the second electrode are not powered on, a plurality of alternately bright and dark stripes may be formed, and thus a grating can be obtained. Under a condition that the first electrode and the second electrode are powered on, the hydrophobic-hydrophilic switching layer becomes hydrophilic, the hydrophilic fluid forces the hydrophobic fluid to accumulate to one side of each cavity unit, thus, enlarging a contact area between the hydrophilic fluid and the hydrophobic-hydrophilic switching layer, and broadening a transparent part of the entire substrate, therefore, when light is incident to the substrate, most of the light can be transmitted through. Herein, the accumulation regions of the hydrophobic fluid are in opaque state, and may block certain regions not being desired to be light-transmitting.

Figure 12:
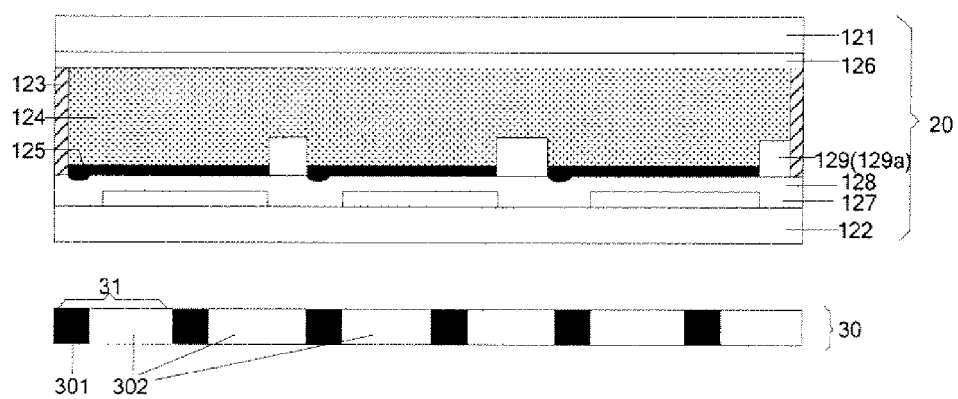
FIG. 12 is a structural cross-sectional view of a display device according to an embodiment of the present invention.
Figure 13:
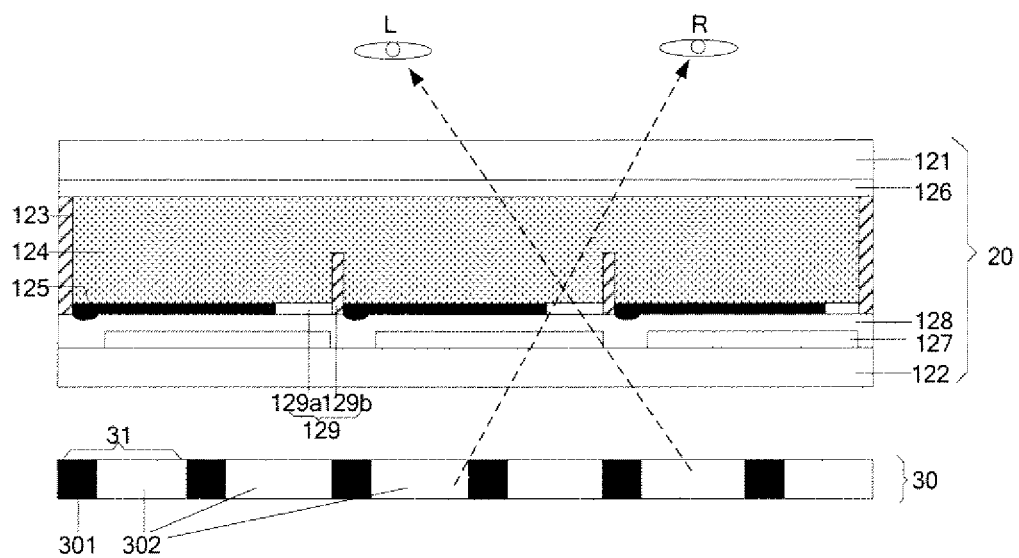
FIG. 13 is a structural cross-sectional view of another display device according to an embodiment of the present invention.
Figure 14:
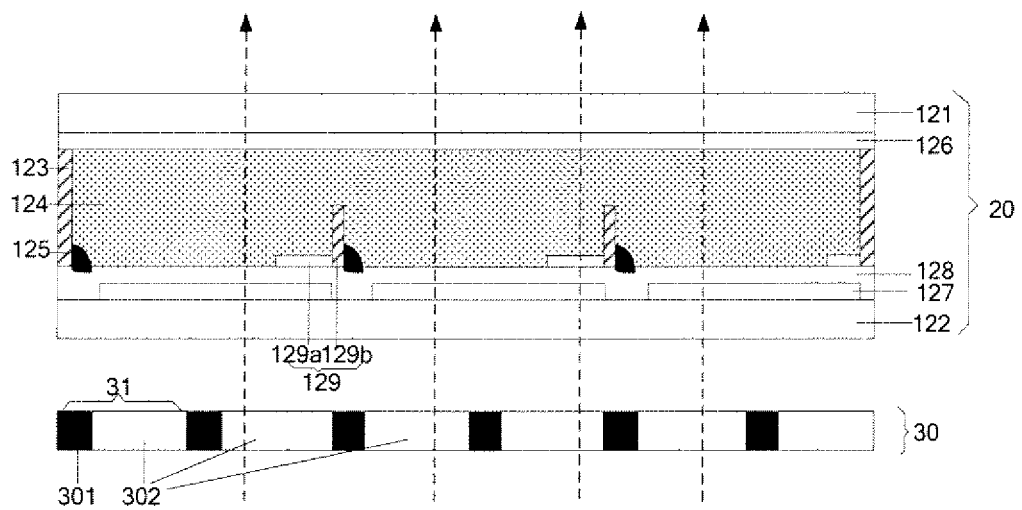
FIG. 14 is a structural cross-sectional view of yet another display device according to an embodiment of the present invention.

An embodiment of the present invention provides a display system, as shown in FIGS. 12-14, including: a display device 30 and a parallax barrier 20, wherein the parallax barrier 20 is the parallax barrier provided in any above-mentioned embodiment.

The display device 30 may be a display device that can generate polarized light or non-polarized light, such as, a liquid crystal display device, an organic light emitting display device, a field emission display device and a plasma display device.

Furthermore, when the display device 30 in the display system is a non-self-luminescent display device, the display system further includes a backlight unit 11.

Furthermore, referring to FIGS. 12-14, the display device 30 includes a plurality of pixels 31, and each of the pixels includes a display region 302 and a non-display region 301.

If all the barrier walls 129 are transparent, each of the barrier walls 129 corresponds to a part of the corresponding display region 302, and one side thereof aligns with a boundary between the corresponding display region 302 and the non-display region 301. Alternatively, if each of the barrier walls 129 includes an opaque part, a transparent part of the barrier wall 129 corresponds to a part of the corresponding display region 302, and a boundary between the opaque part and the transparent part aligns with the boundary between the corresponding display region 302 and the non-display region 301.

For a liquid crystal display device, the display region may be a red, a green or a blue pixel region, and the non-display region may be a black matrix.

For example, as shown in FIG. 12, the barrier wall 129 only includes a transparent barrier strip 129a. At this time, the transparent barrier strip 129a corresponds to a part of the corresponding display region 302, and one side of the transparent barrier strip 129a aligns with a boundary between the corresponding display region 302 and the non-display region 301.

For example, as shown in FIGS. 13-14, the barrier wall 129 includes a transparent barrier strip 129a and an opaque inner cavity wall 129b. Then, the transparent barrier strip 129a corresponds to a part of the corresponding display region 302, a boundary between the inner cavity wall 129b and the transparent barrier strip 129a aligns with the boundary between the corresponding display region 302 and the non-display region 301.

Further, as shown in FIGS. 12-14, when grooves 1281 are formed in the hydrophobic-hydrophilic switching layer 128, the grooves 1281 correspond to the non-display regions 301 and a width of each groove is no more than a width of the corresponding non-display region.

Thus, while the parallax barrier is not powered on, it can be ensured that the transparent part that transmits light is not blocked by the corresponding non-display region 301 in the display device 30, thus, a grating is formed. While the parallax barrier is powered on, and each accumulation region of the hydrophobic fluid 125 corresponds to the corresponding non-display region 301, the influence of the accumulation region on light emitted from the display device can be reduced.

It is noted that, in embodiments of the present invention shown in FIGS. 12-14, one cavity unit corresponds to 2 pixels, which is only an illustration. The cavity unit may correspond to a plurality of pixels, for example, 2-9 pixels, according to actual requirements. Furthermore, FIGS. 12-14 only shows cases that grooves are provided, for a case that there is no groove formed in the hydrophobic-hydrophilic switching layer 128 or the second electrode 127 is a plate electrode, the parallax barrier 20 is provided to the display device in the same manner, so the detailed description is omitted herein.

As shown in FIG. 13, when the display system according to an embodiment of the present invention displays a three dimensional (3D) stereoscopic image, no voltage is supplied to the parallax barrier 20. Then, the hydrophobic fluid 125 spreads along the hydrophobic-hydrophilic switching layer under the action of the hydrophobic-hydrophilic switching layer 128 and extends to the barrier walls 129 but not flow over the barrier walls 129. Since each of the barrier walls contains at least a transparent barrier strip 129a, thereby generating a light-transmitting region. Therefore, left and right eye images displayed by the display device 30 may be respectively directed to left and right eyes of a viewer to form a 3D stereoscopic image.

As shown in FIG. 14, when the display system according to an embodiment of the present invention displays a two dimensional (2D) image, a voltage V1 (namely a voltage difference between the first electrode and the second electrode) is supplied to the parallax barrier 20. At this time, the hydrophobic-hydrophilic switching layer 128 becomes hydrophilic, and thus, the hydrophilic fluid 124 forces the hydrophobic fluid 125 to accumulate towards one side of each of the cavity units but not flow over the barrier wall 129, thus, enlarging a contact area between the hydrophilic fluid 124 and the hydrophobic-hydrophilic switching layer 128, and narrowing down a width of the opaque hydrophobic fluid 125. When each accumulation region of the hydrophobic fluid 125 aligns with the corresponding non-display region 301 of the display device 30, light emitted from the display device 30 can be transmitted through, hence a 2D image can be seen.

An embodiment of the present invention provides a display system comprising a parallax barrier and a display device used together, wherein the parallax barrier can be applicable to both a display device with a polarized emitting light and a display device with a non-polarized emitting light; and when the parallax barrier is not powered on, only transparent parts of barrier walls in the entire parallax barrier transmit light, thereby left and right eye images displayed by the display device can be respectively directed to left and right eyes of a viewer to form a 3D stereoscopic image; and when the parallax barrier is powered on, accumulation regions of the hydrophobic fluid may correspond to the non-display regions of the display device, and thus, light emitted from the display device 30 can be transmitted through, hence a 2D image can be seen. Therefore, the display system can realize switching between a 2D planar image and a 3D stereoscopic image according to different requirements.

An embodiment of the present invention provides a method for manufacturing a parallax barrier, including:

Step 201: forming a first electrode on a first substrate and forming a second electrode on a second substrate.

Optionally, the second electrode may include a plurality of electrode strips spaced apart from each other. Exemplarily, the forming the second electrode including the plurality of electrode strips may comprise: forming the second electrode on the second substrate by a patterning process, wherein the second electrode 127 includes a plurality of second electrode strips spaced apart from each other at an interval, the second electrode strips are in a one-to-one correspondence relationship with cavity units of the parallax barrier, and the interval between the adjacent second electrode strips corresponds to corresponding accumulation region of the hydrophobic fluid while being powered on, and barrier walls partition a closed cavity into the cavity units.

Step 202: forming a hydrophobic-hydrophilic switching layer on the second electrode, and forming the plurality of barrier walls parallel to each other on the hydrophobic-hydrophilic switching layer, the barrier walls include transparent barrier strips; and forming a peripheral cavity wall on a peripheral of the second substrate or the first substrate.

Optionally, the step 202 further comprises: at one side of each of the inner cavity walls that is opposite to the transparent barrier strip contacting it, forming grooves in the hydrophobic-hydrophilic switching layer.

Optionally, the barrier walls may further include inner cavity walls in addition to the transparent barrier strips, and thus, the forming the plurality of barrier walls parallel to each other on the hydrophobic-hydrophilic switching layer may comprises: forming a plurality of the transparent barrier strips parallel to each other and a plurality of inner cavity walls each contacting each of the plurality of the transparent barrier strips on the hydrophobic-hydrophilic switching layer.

Step 203: cell-assembling the first substrate and the second substrate, so that the peripheral cavity wall contacts the first substrate or the second substrate to form the closed cavity; wherein a hydrophobic fluid and a hydrophilic fluid are injected in the closed cavity, the hydrophilic fluid is a transparent material and the hydrophobic fluid is a opaque material. And when not being powered on, a thickness of the hydrophobic fluid is not larger than a height of each of the barrier walls, and when being powered on, a highest place of each of the accumulation region of the hydrophobic fluid is not higher than a highest place of each of the barrier walls.

An embodiment of the present invention provides a manufacturing method of a parallax barrier in which a first electrode is disposed on a first substrate, a second electrode and a second hydrophobic-hydrophilic switching layer are disposed on a second substrate, and in a closed cavity formed between the two substrates, a opaque hydrophobic fluid and a transparent hydrophilic fluid are filled. Due to the blocking of a plurality of parallel barrier walls each including at least a transparent part and the action of the hydrophobic-hydrophilic switching layer, while the first electrode and the second electrode are not powered on, a plurality of alternately bright and dark stripes may be formed, and thus a grating can be obtained. Under a condition that the first electrode and the second electrode are powered on, the hydrophobic-hydrophilic switching layer becomes hydrophilic, the hydrophilic fluid forces the hydrophobic fluid to accumulate to one side of each cavity unit, thus, enlarging a contact area between the hydrophilic fluid and the hydrophobic-hydrophilic switching layer, and broadening transparent parts of the entire substrate, therefore, when light is incident to the substrate, most of the light can be transmitted through. Herein, the accumulation regions of the hydrophobic fluid are in opaque state, and may shadow certain regions not being desired to be light-transmitting.

For a parallax barrier according to an embodiment of the present invention, a first electrode is disposed on a first substrate, a second electrode and a second hydrophobic-hydrophilic switching layer are disposed on a second substrate, and in a closed cavity formed between the two substrates, a opaque hydrophobic fluid and a transparent hydrophilic fluid are filled. Due to the blocking of a plurality of parallel barrier walls each including at least a transparent part and the action of the hydrophobic-hydrophilic switching layer, while the first electrode and the second electrode are not powered on, a plurality of alternately bright and dark stripes may be formed, and thus a grating can be obtained. Under a condition that the voltage difference applied between the first electrode and the second electrode is up to a certain voltage, the hydrophilic fluid forces the hydrophobic fluid to accumulate to one side of each cavity unit, thus, broadening transparent parts of the entire substrate, most of the light can be transmitted through and the accumulation regions of the hydrophobic fluid are in opaque state, and may shadow certain regions not being desired to be light-transmitting. The parallax barrier may be applicable to both a display device with a polarized emitting light and a display device with a non-polarized emitting light and a display system including the parallax barrier can realize switching between a three-dimensional image and a 2D planar image depending on different requirements.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A parallax barrier, comprising:
a first substrate;
a second substrate, cell-assembled with the first substrate;
a peripheral cavity wall, disposed on a periphery of the first substrate and the second substrate to form a closed cavity;
a hydrophilic fluid and a hydrophobic fluid, filled in the closed cavity, wherein the hydrophilic fluid is a transparent material and the hydrophobic fluid is an opaque material;
a first electrode, disposed at a side of the first substrate facing the second substrate;
a second electrode, disposed at a side of the second substrate facing the first substrate;
a hydrophobic-hydrophilic switching layer, disposed at a side of the second electrode facing the first substrate; and
a plurality of barrier walls, disposed at a side of the hydrophobic-hydrophilic switching layer facing the first substrate parallel to each other and spaced apart from each other along a direction parallel to a plane in which the second substrate is located,
wherein at least a part of each of the plurality of barrier walls is transparent, and when not being powered on, a thickness of the hydrophobic fluid is not larger than a height of each of the barrier walls, and when being powered on, a highest place of each of accumulation regions of the hydrophobic fluid is not higher than a highest place of the corresponding barrier wall,
wherein each of the plurality of barrier walls comprises a transparent barrier strip, and widths of transparent barrier strips become narrower in a direction from a middle position of the second substrate to any edge thereof.

2. The parallax barrier according to claim 1, wherein while being powered on, the hydrophobic-hydrophilic switching layer undergoes a switching from hydrophobic to hydrophilic.

3. The parallax barrier according to claim 1, wherein while not being powered on, the thickness of the hydrophobic fluid is not larger than a height of the transparent barrier strip.

4. The parallax barrier according to claim 3, wherein each of the plurality of barrier walls further comprises an inner cavity wall disposed contacting the corresponding transparent barrier strip.

5. The parallax barrier according to claim 4, wherein the inner cavity wall is opaque, and while not being powered on, the thickness of the hydrophobic fluid is not larger than a height of the transparent barrier strip, and while being powered on, the highest place of each of the accumulation regions of the hydrophobic fluid is not larger than the highest place of the corresponding barrier wall.

6. The parallax barrier according to claim 4, wherein the inner cavity walls of the plurality of barrier walls are located at the same side or different sides of the corresponding transparent barrier strips contacting them.

7. The parallax barrier according to claim 4, wherein a groove is formed in the hydrophobic-hydrophilic switching layer at a side of the inner cavity wall that is opposite to the corresponding transparent barrier strip.

8. The parallax barrier according to claim 4, wherein an interval between any two adjacent cavity walls among the peripheral cavity wall and the inner cavity walls of the plurality of barrier walls that are parallel to each other is equal.

9. The parallax barrier according to claim 4, wherein widths of the plurality of transparent barrier strips are equal to each other and widths of the plurality of inner cavity walls are equal.

10. The parallax barrier according to claim 1, wherein the barrier walls partition the closed cavity into a plurality of cavity units.

11. The parallax barrier according to claim 10, wherein each of the plurality of cavity units is closed or non-closed.

12. The parallax barrier according to claim 10, wherein the second electrode comprises a plurality of second electrode strips spaced apart from each other at an interval, the second electrode strips are in a one-to-one correspondence relationship with the cavity units, and the interval between the adjacent second electrode strips corresponds to the accumulation region of the hydrophobic fluid while being powered on.

13. The parallax barrier according to claim 1, wherein the first electrode and the second electrode are plate-shaped.

14. A display system comprising:
a display device;
a parallax barrier according to claim 1, disposed at a light-emitting side or a light incident side of the display device.

15. The display system according to claim 14, wherein the display device comprises a plurality of pixels, each of the plurality of pixels comprising a display region and a non-display region,
under a condition that each of the barrier walls is transparent, each barrier wall corresponds to a part of the corresponding display region, and one side thereof aligns with a boundary between the corresponding display region and the non-display region;
under a condition that each of the barrier walls comprises a opaque part, a transparent part of each of the barrier walls corresponds to a part of the corresponding display region, and a boundary between the opaque part and the transparent part aligns with the boundary between the corresponding display region and the non-display region.

16. The display device according to claim 14, wherein when grooves are formed in the hydrophobic-hydrophilic switching layer, each of the grooves corresponds to the corresponding non-display region and has a width not larger than a width of the corresponding non-display region.

17. A method for manufacturing a parallax barrier, comprising:
forming a first electrode on a first substrate;
forming a second electrode on a second substrate;
forming a hydrophobic-hydrophilic switching layer on the second electrode;
forming a plurality of barrier walls parallel to each other on the hydrophobic-hydrophilic switching layer;
forming a periphery cavity wall at a periphery of the second substrate or the first substrate;
cell-assembling the first substrate and the second substrate to make the periphery cavity wall to contact the first substrate or the second substrate so as to form a closed cavity,
wherein there are a hydrophobic fluid and a hydrophilic fluid filled in the closed cavity, the hydrophilic fluid is a transparent material, the hydrophobic fluid is an opaque material; and while not being powered on, a thickness of the hydrophobic fluid is not larger than a height of each of the barrier walls, while being powered on, a highest place of an accumulation region of the hydrophobic fluid is not larger than a highest place of the corresponding barrier wall,
wherein each of the plurality of barrier walls comprises a transparent barrier strip, and widths of transparent barrier strips become narrower in a direction from a middle position of the second substrate to any edge thereof.

18. The method according to claim 17, wherein each of the barrier walls further comprises an inner cavity wall disposed contacting the transparent barrier strip.

19. The method according to claim 18, wherein forming the hydrophobic-hydrophilic switching layer on the second electrode comprises:
depositing a hydrophobic-hydrophilic switching material layer on the second electrode; and
forming grooves at a side of the hydrophobic-hydrophilic switching material layer that faces the first substrate, wherein the grooves are disposed at a side of the inner cavity walls to be formed that is opposite to the transparent barrier strips they contact.

* * * * *